US009632717B2

(12) United States Patent
Petruzzo et al.

(10) Patent No.: US 9,632,717 B2
(45) Date of Patent: Apr. 25, 2017

(54) WRITE ONCE READ MANY MEDIA METHODS AND SYSTEMS

(71) Applicant: GreenTec-USA, Inc., Reston, VA (US)

(72) Inventors: Stephen E. Petruzzo, Great Falls, VA (US); Richard E. Detore, Clifton, VA (US)

(73) Assignee: GreenTec-USA, Inc., Reston, VA (US)

( * ) Notice: Subject to any disclaimer, the term of this patent is extended or adjusted under 35 U.S.C. 154(b) by 0 days.

(21) Appl. No.: 15/131,092

(22) Filed: Apr. 18, 2016

(65) Prior Publication Data
US 2016/0253117 A1    Sep. 1, 2016

Related U.S. Application Data

(63) Continuation of application No. 13/834,182, filed on Mar. 15, 2013, now Pat. No. 9,317,426.

(60) Provisional application No. 61/749,995, filed on Jan. 8, 2013, provisional application No. 61/767,667, filed on Feb. 21, 2013.

(51) Int. Cl.
G06F 3/06        (2006.01)
G06F 12/02       (2006.01)
G06F 17/30       (2006.01)
G06F 12/06       (2006.01)

(52) U.S. Cl.
CPC .......... *G06F 3/0619* (2013.01); *G06F 3/0623* (2013.01); *G06F 3/0644* (2013.01); *G06F 3/0659* (2013.01); *G06F 3/0674* (2013.01); *G06F 3/0685* (2013.01); *G06F 12/0238* (2013.01); *G06F 12/0646* (2013.01); *G06F 17/30188* (2013.01); *G06F 2212/2024* (2013.01); *G06F 2212/2142* (2013.01)

(58) Field of Classification Search
None
See application file for complete search history.

(56) References Cited

U.S. PATENT DOCUMENTS 6,018,789 A   1/2000  Sokolov et al.
6,128,627 A   10/2000 Mattis
6,469,854 B1  10/2002 Gill et al.
6,691,213 B1  2/2004  Luu
(Continued)

OTHER PUBLICATIONS

Russian Patent Office, Written Opinion of the International Search Authority in PCT App. No. PCT/US2014/010609, May 15, 2014.
(Continued)

*Primary Examiner* — Charles Rones
*Assistant Examiner* — Hewy Li
(74) *Attorney, Agent, or Firm* — Cahn & Samuels, LLP

(57) ABSTRACT

A method and/or system for providing for write once read many (WORM) times from at least some addresses of a storage drive that is otherwise manufactured for multiple writes to individual addresses. In at least one embodiment, a WORM area(s) is defined by a START_LBA and an END_LBA and the method uses a HWM_LBA to determine whether a LBA in the WORM area has been written to previously and to prevent previously written to LBA(s) in the WORM area from being rewritten. In at least one embodiment where there are multiple WORM areas, each WORM area has its own respective START_LBA, END_LBA and HWM_LBA.

13 Claims, 7 Drawing Sheets

(56) References Cited

U.S. PATENT DOCUMENTS

| | | | |
|---|---|---|---|
| 6,779,080 B2 | 8/2004 | Basham et al. | |
| 7,020,734 B2 | 3/2006 | Mimatsu et al. | |
| 7,509,441 B1* | 3/2009 | Merry | G06F 3/0604 710/36 |
| 9,158,700 B2* | 10/2015 | Goss | G06F 12/0804 |
| 9,317,426 B2 | 4/2016 | Petruzzo | |
| 2001/0056543 A1 | 12/2001 | Isomura | |
| 2005/0223167 A1* | 10/2005 | Nishimoto | G06F 3/0623 711/113 |
| 2005/0231846 A1 | 10/2005 | Winarski | |
| 2007/0043870 A1 | 2/2007 | Ninose | |
| 2007/0094470 A1* | 4/2007 | Haustein | G06F 12/1441 711/163 |
| 2008/0250228 A1 | 10/2008 | Elliott | |
| 2008/0250509 A1 | 10/2008 | Ahvenainen | |
| 2008/0276051 A1 | 11/2008 | Renno | |
| 2009/0094421 A1 | 4/2009 | Lewis | |
| 2011/0093677 A1 | 4/2011 | Cherian | |
| 2011/0113207 A1 | 5/2011 | Fiske | |
| 2012/0284467 A1 | 11/2012 | Bish | |
| 2014/0195747 A1 | 7/2014 | Petruzzo | |

OTHER PUBLICATIONS

Russian Patent Office, International Search Report in PCT App. No. PCT/US2014/010609, May 15, 2014.
U.S. Patent and Trademark Office, Office Action in U.S. Appl. No. 13/835,477, Jan. 9, 2015.
U.S. Patent and Trademark Office, Final Office Action in U.S. Appl. No. 13/835,477, Aug. 24, 2015.

* cited by examiner

Example Single WORM Area on a 20 LBA Disk
RW1=LBA 0 – 4, WORM Area=LBA 5 – 14, RW2=LBA 15 - 19

WRITE ONCE READ MANY MEDIA METHODS AND SYSTEMS

This patent application is a continuation application of U.S. patent application Ser. No. 13/834,182, filed Mar. 15, 2013 and issued as U.S. Pat. No. 9,317,426 on Apr. 19, 2016, which application claims priority to of U.S. Provisional Patent Application No. 61/767,667, filed Feb. 21, 2013, and claims priority to U.S. Provisional Patent Application No. 61/749,995, filed Jan. 8, 2013. All of these applications are hereby incorporated by reference in their entireties.

I. FIELD OF THE INVENTION

This invention relates to methods and systems for implementing one-time write capability on drives that allow data to be rewritten including, for example, hard disk drives, flash memory drives, solid state drives, optical drives and other storage devices.

II. SUMMARY OF THE INVENTION

The methods described herein in at least one embodiment enable disk drives and other storage devices to have data blocks or data files written one time only to ensure that the data blocks or files cannot be modified after their initial write. This one-time write capability is referred to as a Write Once Read Many (WORM) and is conceptually similar to a CDROM where data blocks or data files can only be written once. However, a significant difference is that these new methods provide WORM capability to hard disk drives, flash memory drives, solid state drives, optical drives and other storage devices.

There are many applications for these WORM drives. Examples include but are not limited to judicial systems, medical communities, security video and audio surveillance, sensitive classified documents and other applications. One initial application of these WORM disks is for evidence in a legal proceeding of video surveillance recording to increase confidence that the video cannot be altered once written.

At least one embodiment according to the invention includes a method for providing write once read many times media on a storage drive in communication with an external computing system, the method including: receiving a Write command with a drive controller where the Write command is sent from the external computing system; determining with the drive controller whether the Write command is for a LBA within the WORM boundary area on a storage drive media as defined by a START_LBA and an END_LBA; when the LBA to be written is not within the WORM boundary area, then the drive controller performs the Write command on the storage drive media; and when the LBA to be written is within the WORM boundary area, then the drive controller determines whether the LBA to be written to is a) greater than or b) greater than or equal to a HWM_LBA, when the LBA to be written to is not greater than the HWM_LBA, the drive controller sends an error condition to the external computing device (alternatively no error condition is sent) and the drive controller does not perform the Write command, and when the LBA to be written to is greater than the HWM_LBA, the drive controller performs the Write command on the storage drive media and updates the HWM_LBA to equal the last LBA written to as part of the Write command. In a further embodiment to the previous embodiments, when the LBA to be written to is greater than the HWM_LBA, the drive controller stores the updated HWM_LBA in at least one of a non-volatile memory and a persistent memory.

In a further embodiment to any of the previous embodiments, the method further includes activating the WORM capability by flashing or loading the drive controller with firmware capable of performing the method or activating the WORM capability upon receiving an activation instruction by the drive controller. In a further embodiment to either embodiment of this paragraph, the method further includes disabling a re-flash capability or setting a flag that prevents the drive controller from receiving future firmware updates or disabling the storage drive upon removal of a printed circuit logic board present in the storage device. In a further embodiment to any of the embodiments of this paragraph, the method further includes for at least one WORM area of the drive storage media, setting the START_LBA, the END_LBA, and the HWM_LBA where the HWM_LBA will be one less than the START_LBA.

In a further embodiment to any of the previous embodiments, when the LBA to be written to is greater than the HWM_LBA, the HWM_LBA is updated after the performance of the Write command. In a further embodiment to any of the previous embodiments in the prior paragraphs, when the LBA to be written to is greater than the HWM_LBA, the performance of the Write command is performed before the HWM_LBA is increased.

In a further embodiment to any of the previous embodiments, the method further includes receiving a command by the drive controller to set the START_LBA to a lower value in order to extend the WORM area boundary. In a further embodiment to the prior embodiment, the START_LBA is set to equal the lowest LBA present on the drive. In a further embodiment to any of the previous embodiments, the method further includes receiving a command by the drive controller to set the END_LBA to a higher value in order to extend the WORM area boundary. In a further embodiment to any of the previous embodiments, the method further includes receiving a command by the drive controller to set the HWM_LBA to a higher value in order to write protect additional LBAs in the WORM area. In a further embodiment to any of the previous embodiments discussed in the prior paragraphs, the method further includes receiving a single command by the drive controller to set the START_LBA to a lower value and at least one of the HWM_LBA and the END_LBA to a higher value in order to at least one of extend the WORM area boundary and write protect additional LBAs in the WORM area. In a further embodiment to the previous embodiment, the START_LBA is set to equal the lowest LBA present on the drive. In a further embodiment to either of the previous two embodiments, at least one of the HWM_LBA and the END_LBA is set to equal the highest LBA that can be written to on the drive.

At least one embodiment according to the invention includes a storage device including: a physical storage media; and a drive controller in electrical communication with the physical storage media, the drive controller having encoded thereon: first program instructions executable by the drive controller to cause the drive controller to receive a Write command with a drive controller where the write command is sent from the external computing system; second program instructions executable by the drive controller to cause the drive controller to determine whether the Write command is for a LBA within the WORM boundary area on a storage drive media as defined by a START_LBA and an END_LBA; third program instructions executable by the drive controller to cause the drive controller to perform the Write command on the storage drive media when the LBA to be written to is not within the WORM boundary area; and fourth program instructions executable by the drive controller to cause the drive controller to perform the following when the LBA to be written is within the WORM boundary area: determine whether the LBA to be written to is greater than a HWM_LBA, when the LBA to be written to is not greater than the HWM_LBA, the drive controller sends an error condition to the external computing device and the drive controller does not perform the Write command, and when the LBA to be written to is greater than the HWM_LBA, the drive controller performs the Write command on the storage drive media and updates the HWM_LBA to equal the last LBA written to as part of the Write command. In a further embodiment to the previous embodiment, the storage device further includes a non-volatile storage in electrical communication with the drive controller, the non-volatile storage stores at least one of the HWM_LBA, the START_LBA, and the END_LBA. In a further embodiment, the storage device further includes a persistent memory in electrical communication with the drive controller, the persistent memory stores at least one of the HWM_LBA, the START_LBA, and the END_LBA. In a further embodiment to any of the previous storage device embodiments, the program instructions are present in a firmware residing on the drive controller.

At least one embodiment according to the invention includes a storage device including: a physical storage media having at least one WORM area with a START_LBA and an END_LBA; a drive controller in electrical, magnetic, optical or mechanical communication with the physical storage media, the drive controller allows for no more than one Write command to be performed on each LBA from the START_LBA to the END_LBA.

Given the following enabling description of the drawings, the methods and systems according to different embodiments of the invention should become evident to a person of ordinary skill in the art.

III. BRIEF DESCRIPTION OF THE DRAWINGS

The present invention is described with reference to the accompanying drawings. In the drawings, like reference numbers indicate identical or functionally similar elements. The use of cross-hatching and shading within the drawings is not intended as an indication of the materials being used to manufacture the invention, but instead intended to distinguish different areas in the graphical representation of media in a storage device.

IV. DETAILED DESCRIPTION OF THE DRAWINGS

The invention in at least one embodiment includes a method that implements the Write Once Read Many (WORM) drive requirements through incorporation into, for example, the drive controller firmware or other media controller mechanisms to provide the WORM capability and to enforce the Logical Block Addresses (LBA) boundary parameters used to determine where the data can be written only one time on a storage drive. In at least one embodiment, the drive controller operates according to the firmware installed on it. Examples of a storage drive include but are not limited to hard disk drives, flash memory drives, solid state drives, optical drives and other storage devices. Examples of other media controller mechanisms include but are not limited to printed circuit boards (PCB) with processor based logic, field programmable gate array (FPGA), application specific integrated circuit (ASIC), and discrete logic hardware. In at least one embodiment, the system includes a storage drive that is for use only as a WORM drive with data storage intended for the WORM areas and system Read-Write files.

Depending on the exact implementation, the entire storage drive or a portion(s) of the storage drive may be used as the WORM area(s) with any remaining areas of the storage drive being used as Read-Write areas for storage of other data such as any necessary system Read-Write files. In at least one embodiment, the WORM area(s) consists of contiguous LBAs on the storage drive and is bounded by a START_LBA and an END_LBA with the WORM data content being written only to logical blocks residing within the WORM area boundaries. In contrast, the area(s) of the storage drive not within the bounds of a WORM area(s) are considered to be Read-Write area(s) for data, which includes but is not limited to, for example, system data, meta-data to support the file system (e.g., directory structures, file allocation tables, etc.) or other data that requires unrestricted write capability where these examples are collectively known as system files.

In at least one embodiment, WORM integrity is maintained regardless of which computer hardware, computer operating system, host interface or host controller is being used for media access of the storage drive. In at least one embodiment, this is possible by implementing the WORM capabilities at the lowest hardware layer within the disk controller. A further approach used in at least one further embodiment to ensure WORM integrity is by disabling the ability to flash a memory or firmware update to the drive controller thus preventing the opportunity to reload any contents into the drive controller. Another approach in at least one further embodiment is to detect or prevent circumvention by replacement of the storage drive electronics' printed circuit board and disable access when this is detected or occurs.

Figure 1A:
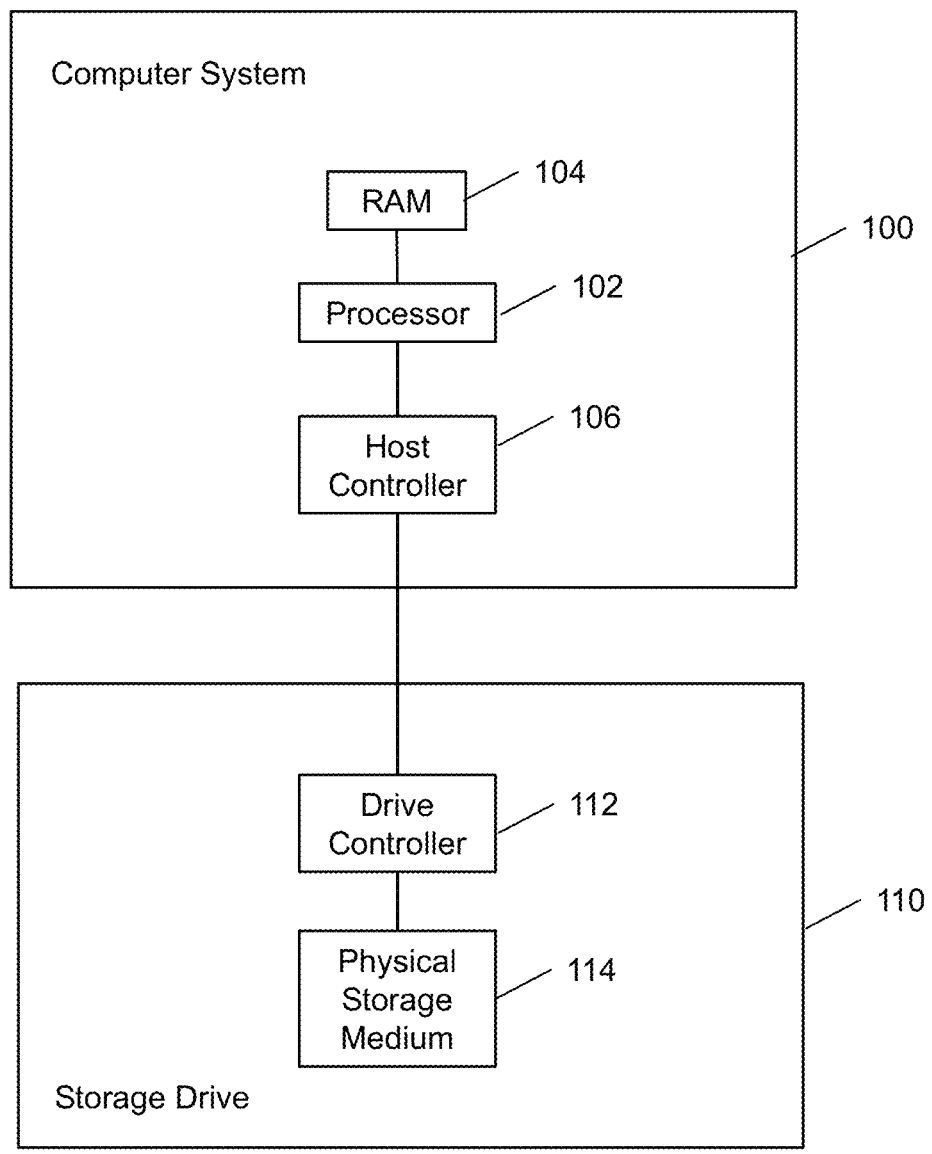
FIG. 1A illustrates an example block diagram.

FIG. 1A illustrates a block diagram representation of a computer system 100 in communication with a WORM storage drive 110. The illustrated computer system 100 includes a processor 102 and RAM 104 (or other appropriate memory) for running application software, a file system, an operating system, and a device driver, and a host controller 106. The illustrated storage drive 110 includes a drive controller 112 and a physical storage media 114. In an alternative embodiment, the computer system serves as a drive controller for multiple storage drives in communication with the computer system. The application software sends a write instruction (or command) to the file system and/or the operating system to store the data on the storage drive. The file system or operating system allocates an LBA to be used on the storage drive. The Write instruction and the LBA(s) are sent to the device driver that forwards the information from the computer system to the host controller. The host controller interfaces with the drive controller to write the information to the physical storage media. The drive controller tracks the LBA(s) used and adjusts the High-Water Mark (HWM) LBA to equal the highest LBA used to write the information in response to the Write instruction. In at least one embodiment, the file system sends instructions that write data in a predictable way by, for example, incrementally progressing through the LBAs of the storage drive. In a further embodiment where the file system sends instructions to write data in a higher LBA resulting in a gap between the LBA being written to and the HWM_LBA, the HWM_LBA will be set to the last LBA written to as part of the Write instruction, which for the purposes of this disclosure includes any instruction that impacts the data stored at the LBA(s) being addressed. However, if an attempt is made to write an LBA which is not greater than the HWM_LBA and within the WORM area, then the Write instruction is aborted and/or an error notification is returned to the computer system 100.

Figure 1B:
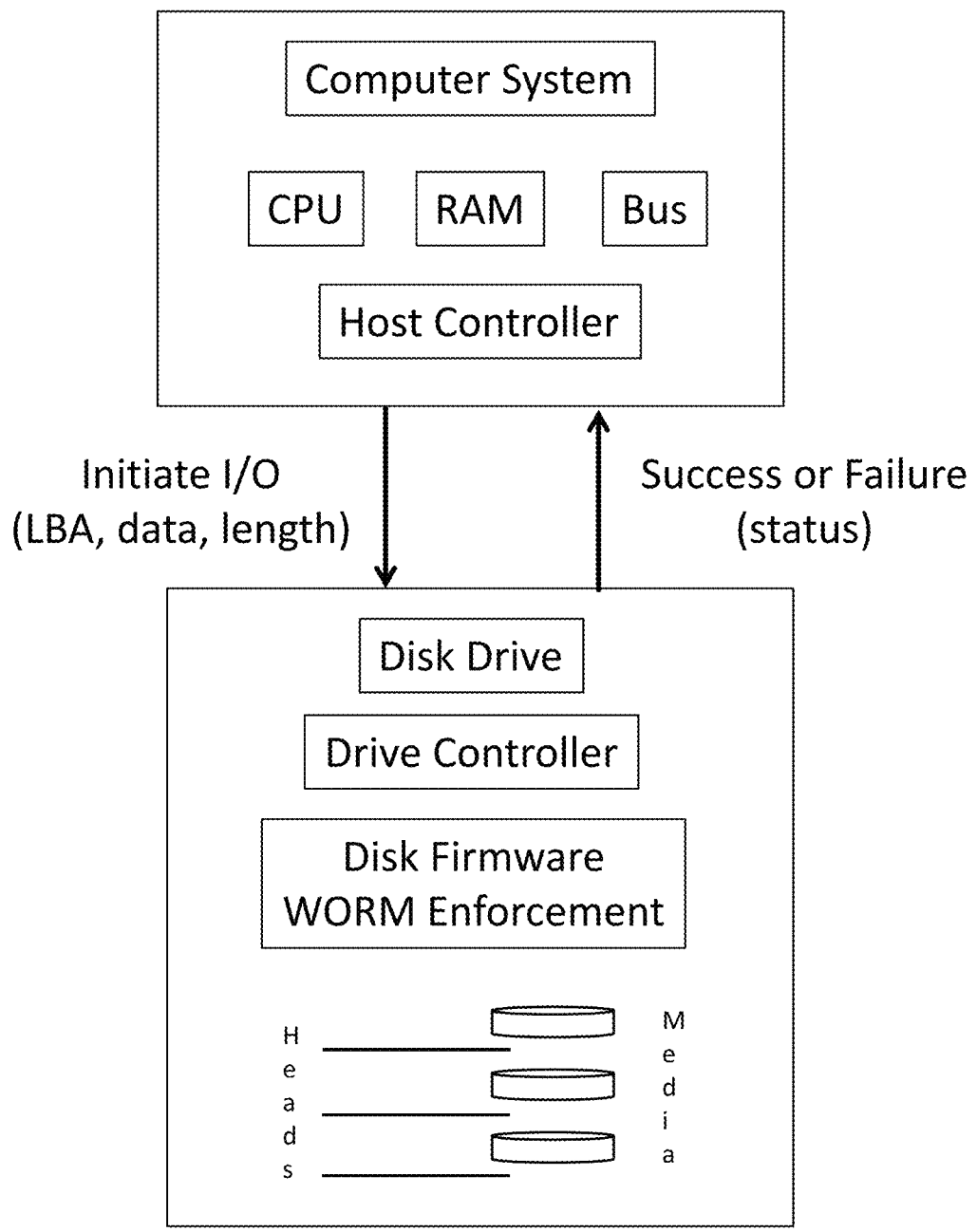
FIG. 1B illustrates another example block diagram.
Figure 2:
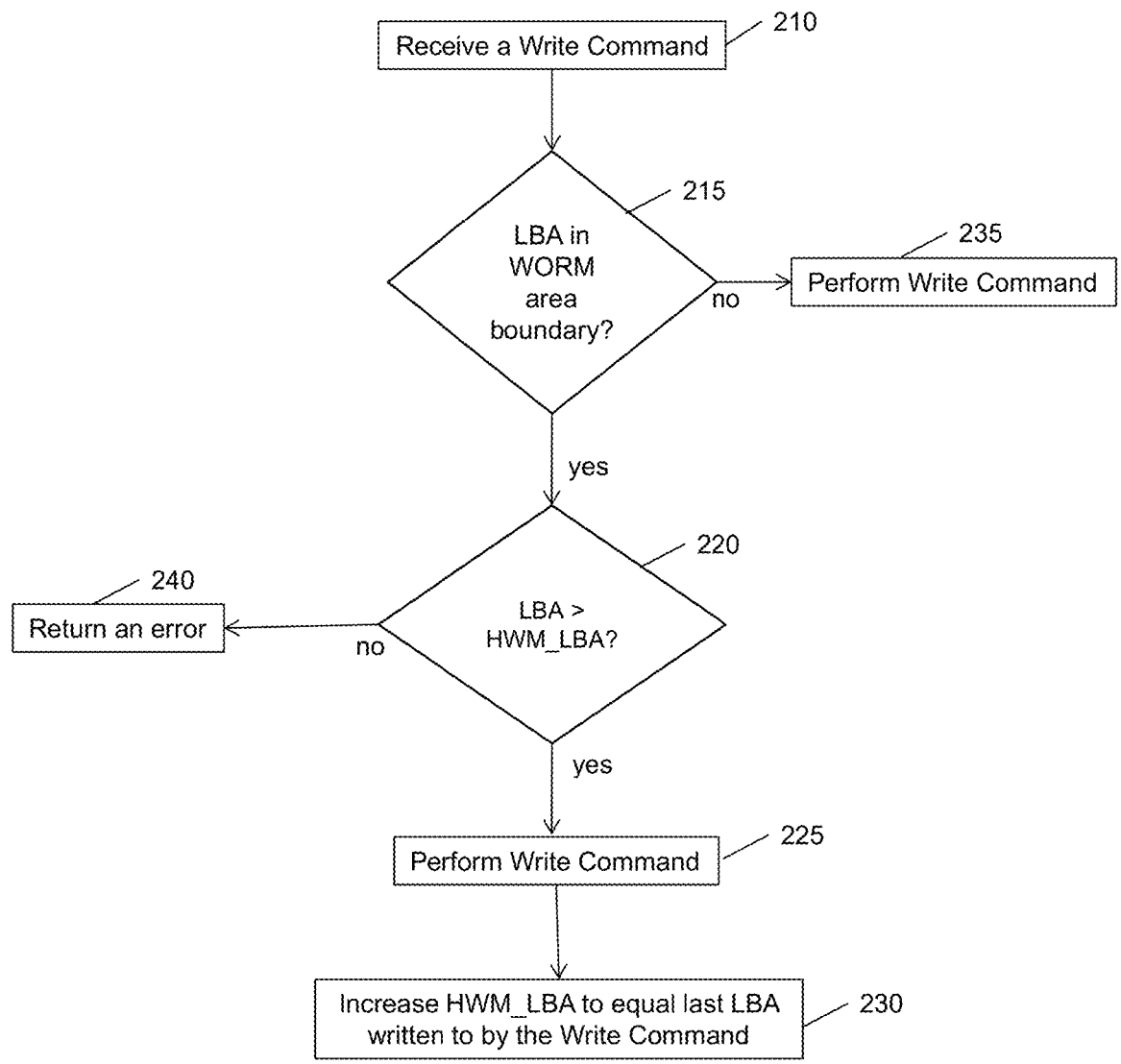
FIG. 2 illustrates an example flow diagram according to at least one embodiment of the invention.

FIG. 2 illustrates an example method embodiment according to the invention. The illustrated method includes receiving a Write command by the drive controller that was sent by an initiator, 210. The initiator generically refers to the process that requested the I/O operation such as a Write command. There are many layers including, for example, the application, the file system, the operating system, and the device driver as illustrated in FIG. 1B. Several protocols may be used (e.g., SATA, ATA, Fibre Channel, etc.) to facilitate the communication. Generically, the Write instruction is initiated by an application and success or failure of the operation is returned back to the application. Interfaces and flow is typically from the initiator software application (e.g., Word), to the file system, to the operating system (OS) (e.g., Windows, Linux, etc.), to the device driver, to the host controller and then to the drive controller. Success or failure error conditions are passed in reverse from the drive controller to the host controller up through to the application, which would be the initiator in this example. In alternative embodiment, the drive controller does not provide success or failure error conditions.

The drive controller determines whether the Write command is for a LBA within the WORM boundary area, 215. If the LBA falls within the WORM boundary area (i.e., within the range of START_LBA and END_LBA), the drive controller determines whether the LBA is greater than the HWM_LBA, 220. If both of these conditions are met, then the Write instruction is performed and the HWM_LBA is set to the value of the written LBA, 225. In at least one embodiment, the drive controller determines whether this condition is met by comparing the LBA to the HWM_LBA for the intended WORM area. The drive controller sets the HWM_LBA equal to the last LBA number written to within the WORM area, 230. The firmware on the drive controller updates the HWM_LBA and saves it as required. When the drive controller determines that the LBA is not greater than the HWM_LBA, then the drive controller sends an error condition to the computer system, 240.

In an alternative embodiment, the controller determines whether the LBA to be written to is between the HWM_LBA and the END_LBA in one step.

When the drive controller determines that the LBA does exceed the END_LBA, the drive controller will perform the Write instruction, 235. In an alternative embodiment, the Write instruction is performed when it is not governed by other restrictions (e.g., it is within the physical disk size, it would violate security or other standard disk operations). In an alternative embodiment to the current embodiment, the drive controller will send a notification to the computer system when the HWM_LBA equals and/or exceeds the END_LBA.

Figure 3:
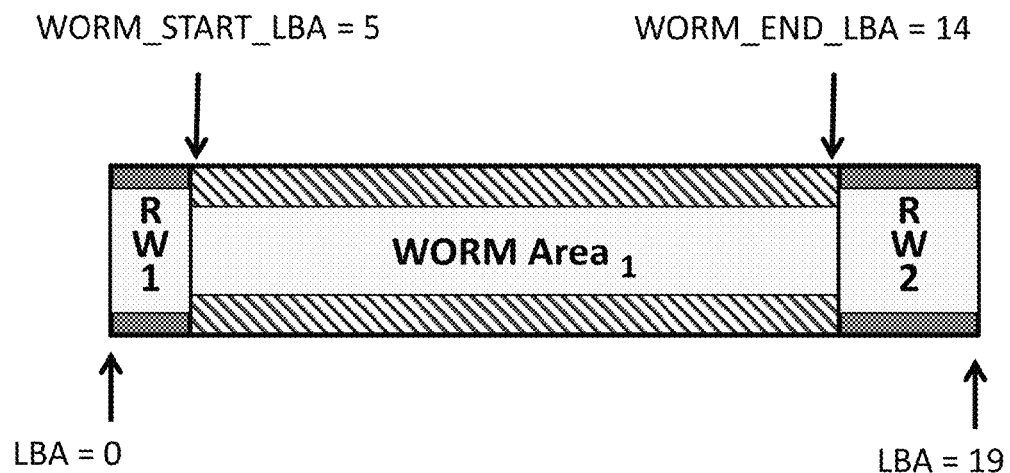
FIG. 3 illustrates a simplified example WORM area on a storage drive media according to at least one embodiment of the invention.

In an alternative embodiment, when the Write instruction is for multiple LBAs the ending LBA is determined and compared to the WORM area boundary and if the data to be written starts in a non-WORM area but overlaps into a WORM area, then the Write instruction is aborted (e.g., in FIG. 3, a write for LBA number 4 with a length of 1024 bytes, will result in LBA 4 with 512 bytes and LBA 5 with 512 bytes attempting to be written, and since LBA 5 is within the WORM boundary, the Write instruction will not be performed (i.e., aborted) and/or an error will be returned). In a further alternative embodiment, the Write instruction will be permitted if the HWM_LBA is at its initial state in which case the WORM area has not been written to and is available to be written to by the drive controller and the HWM_LBA will be updated, which in the example of FIG. 3 would be 5 after the write.

The drive controller will allow LBA sectors in the Read-Write areas unlimited Read and Write activity and will enforce WORM activity only in those WORM area(s) defined by WORM area boundaries. In a further embodiment to the previous embodiments, the drive controller will write the received data without restriction to LBAs outside of the WORM area and will not update the HWM_LBA.

In a further embodiment to any of the previous embodiments, the HWM_LBA is set initially to the value of START_LBA minus one for each WORM area present on the drive or partition and the check against the HWM_LBA is to determine if the LBA to be written is greater than the HWM_LBA. In another embodiment, the HWM_LBA is set initially to the value of the START_LBA and the check against the HWM_LBA is to determine if the LBA to be written to is equal to or greater than the HWM_LBA. In a further alternative embodiment, when the START_LBA is set equal to the last Read-Write LBA before the WORM, then the determination regarding whether a Write instruction to a LBA falls within the boundary area is adjusted to reflect the START_LBA being outside the boundary area and a similar adjustment is made for the use of the HWM_LBA.

In at least one embodiment, the LBA values are set initially by the drive controller. In an alternative embodiment, the LBA values are set initially when the firmware is loaded onto the storage drive (e.g., initial flash) or a Programmable Read Only Memory (PROM), or it may be set when a special command is sent to the drive to turn the storage drive into a WORM drive.

In at least one embodiment, the storage drive will include persistent memory that will store the HWM_LBA and WORM boundaries in such a way that if power is lost or an error scenario arises that the HWM_LBA and WORM boundaries are maintained and consistent with the standard drive characteristics.

In at least one embodiment, the drive controller stores the HWM_LBA and the WORM boundaries in any persistent memory that the drive controller can utilize such as on the drive media itself, in tracks that are reserved for the drive controller's use and are never user accessible, non-volatile RAM (NVRAM), on the controller printed circuit board (PCB) or other non-volatile storage (NVS). In a further embodiment, the NVS is a separate memory such as CMOS, flash, non-volatile RAM, or solid state. In an alternative embodiment, the information is retained on the media itself in an area that is not accessible by any process other than the drive controller firmware. In a further alternative embodiment, the HWM_LBA and WORM boundaries may be stored in different places or a mixture of locations/media, for example, the START_LBA and the END_LBA are stored on the drive controller (or storage media on the drive controller) while the HWM_LBA is stored on the storage media or non-volatile RAM. In a further embodiment, the START_LBA and the END_LBA are stored as data constants defined in the disk controller firmware.

FIG. 3 provides an example of a WORM area that will be used to describe different scenarios in this paragraph that uses an embodiment where the first LBA to be written to in the WORM area by a Write instruction needs to be greater than the HWM_LBA. In these examples the initial state for the HWM_LBA is 4. The WORM area boundary is 5 to 14. In the first example, a Write instruction is received to write data to LBA 5, which will occur because 5 is greater than 4 and HWM_LBA will be set to 5. In the second example, a Write instruction is received to write data to LBA 10, which will occur because 10 is greater than 5 (which is the HWM_LBA after completion of the first example) and HWM_LBA will be set to 10 (LBAs 6-9 will become un-writable as the HWM_LBA has passed them by). In the third example, a Write instruction is received to write data to LBA 10, which will produce an error message and not occur because 10 is not greater than 10 (which is the HWM_LBA after the second example). In the fourth example, a Write instruction is received to write data to LBA 15, which will occur because 15 is outside the WORM area boundary and the HWM_LBA will not increase. In the fifth example, a Write instruction is received to write data to LBA 14, which will occur because 14 is greater than 10 (which is the current HWM_LBA after the second example) and the HWM_LBA will be set to 14 thus making LBAs 11-13 un-writeable as the HWM_LBA jumped from 10 to 14. Any Write instruction received for LBAs 0-4 and 15-19 will be performed by the drive controller without restriction.

In an alternative embodiment, the Read-Write areas also include space for storing user generated data in addition to the system files. In a further embodiment, the storage device is partitioned into multiple logical drives (or data areas) that are controlled by different file systems. An example is where the first partition includes system files and at least one WORM area while the second partition is for saving user files in a drive that is entirely Read-Write area. Another example is where the first partition is entirely Read-Write while the second partition includes a WORM area. As additional partitions are created, the WORM area(s) can be implemented on different partitions where the partitions would be treated as separate drives.

The invention includes different embodiments for handling the updating of HWM_LBA and writing the data of the LBA.

In one example method, the HWM_LBA is updated and saved to NVS before the data of the LBA is written. If the power to the storage drive is interrupted after the HWM_LBA has been incremented (or updated) and before the data of the LBA is written, then there would be one wasted LBA on the storage drive where data cannot be written by the controller. This approach makes sure that the data of the LBA cannot be written twice after the power is restored and ensures that the data cannot be overwritten. For example, if the write algorithm only permitted writes if LBA# is greater than HWM_LBA, then if HWM_LBA equals 99 and the data is destined for LBA 100 or greater, than the data is written. However, if power is interrupted before data is written to LBA 100 but after HWM_LBA is incremented to 100, then after power is restored data will not be able to be written to LBA 100. In this case successive writes would only be permitted for LBAs greater than 100 and LBA 100 would have never been written and is lost space but data integrity is maintained. There are many variants that would work, depending on the file system and the order in which the file system marks the LBA allocated, then writes it, or if it writes the LBA, then marks it allocated. When marked allocated, the file allocation table (FAT) is updated to indicate that the LBA is used. But if the FAT is written first, then power is lost, the data has not been written but the LBA is marked as used. This is a similar problem that occurs when there is a power outage in the middle of processing.

In another example method, the data of the LBA is written before the HWM_LBA is incremented. If the power to the storage drive is interrupted after the data of the LBA is written but before the HWM_LBA is incremented, then when power is restored, the file system must allocate new data blocks past the last written LBA and this will prevent any potential second writes on the just written to LBA.

Due to the nature of not being able to write to the WORM areas defined on the storage drives after an initial write, the storage drive would be rendered useless if the WORM areas were activated and then LBAs were written to the drive when it was formatted, since this format would potentially write the LBAs defined within the WORM area, preventing those data blocks to be written with data after the disk was formatted. The following two methods provide examples of how the WORM areas used by any of the other methods and systems discussed in this disclosure could be activated.

The first example method is to activate after flashing the storage controller with firmware having the WORM capability. Under this method, the storage drive will have normal input/output (I/O) activity using the factory installed firmware until the firmware is flashed with the WORM version of the firmware. The advantage of this approach is that the storage drive can be formatted, tested or have other unrestricted I/O activity performed until such a time that it is desired to turn the storage drive into a WORM storage drive. Once it is desired to turn the storage drive into a WORM storage drive, the firmware will be flashed with the WORM version of the firmware. Afterwards, the storage drive will be a permanent WORM disk implementing all methods required to fully enforce WORM integrity.

The second example method is to activate in response to a command to activate or enable WORM capability. The WORM firmware would be resident on the storage drive from the factory, but the firmware operates in unrestricted (inactive) mode until a command sequence is sent to the storage drive. Once the firmware receives an Activate WORM command (or command sequence), the firmware will fully enforce the above-described WORM capabilities. The advantage of this approach is that the firmware does not need to be reloaded (or flashed) to enable WORM disk capability. The storage drive can be used for testing and normal I/O activity with default factory settings. When it is desired to turn it into a WORM storage drive, the storage drive may be formatted with the desired file system, then the Activate WORM command will be sent to the storage drive. In order to ensure integrity of the WORM capability, after receipt of the Activate WORM command, the firmware will enforce write once per LBA in WORM areas, disable commands that could violate WORM integrity, disable flash capability, disable any backdoor interfaces to the storage drive and provide any other required mechanisms required to enforce WORM integrity.

Further to either of the above activation methods, the controller will set the WORM area(s) on the storage drive media based on the file system used to format the storage drive media. WORM areas are pre-selected and chosen through analysis and pre-knowledge of the file system data structures and workings. Based on each file system, it has been determined how the file system works and where it is going to allocate the system areas and data areas. So we setup the START_LBA and END_LBA for the WORM area(s) based on this analysis. In at least one embodiment, a database is provided that includes a plurality of combinations of drive (or partition) sizes, file system formats, and cluster sizes to allow for the drive controller firmware to be configured with, or for the firmware to determine what the START_LBA, END_LBA and initial HWM_LBA are. Collectively, the START_LBA, the END_LBA, and the HWM_LBA are WORM parameters.

The following embodiments are examples of how a drive controller and/or firmware would receive a command resulting in it preventing any LBA present on the physical storage medium being written to or otherwise changed. The embodiments illustrated in FIGS. 4A and 4B illustrate how less than all LBAs present on the physical storage medium may be protected.

Figure 4A:
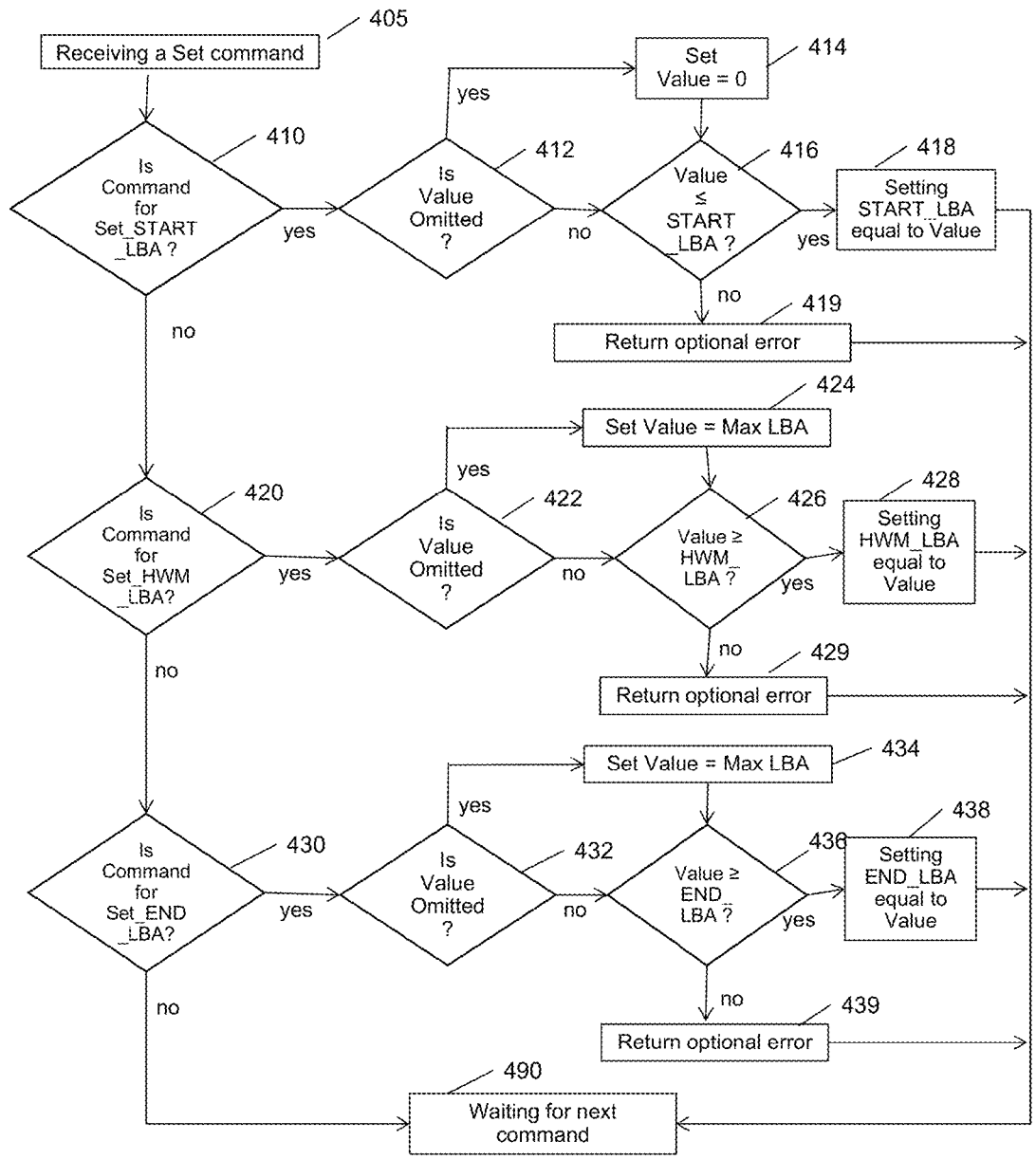
FIGS. 4A and 4B illustrate example flow diagrams according to at least one embodiment of the invention.
Figure 4B:
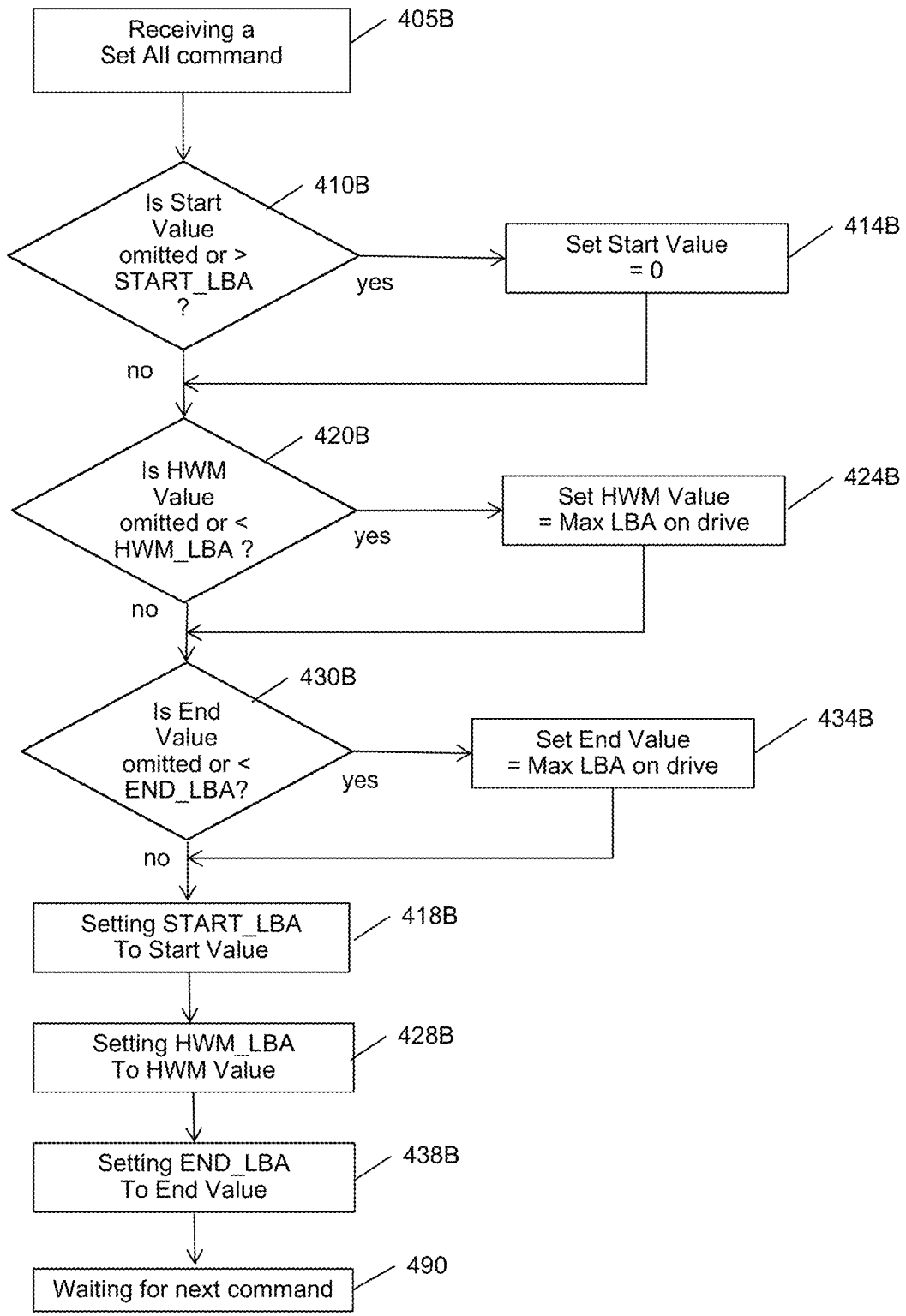

FIG. 4A illustrates an example method for resetting WORM parameters thereby extending the WORM boundaries either lower (for the START_LBA) or higher (for the END_LBA) by sending a special Set command to the drive controller regardless of the method used for WORM activation. The method illustrated in FIG. 4A provides an example of how the Set command may be directed at one of the WORM parameters, while in FIG. 4B a method is illustrated that allows for a Set command to modify multiple WORM parameters with one command. Both illustrated methods allow the START_LBA to only be decreased to a new Value and the HWM_LBA and END_LBA to only be increased to a new Value, and the rationale for this is to protect WORM data that is present in the original (or previously enlarged) WORM area boundary. In an alternative method, the START_LBA may be lowered and/or the HWM_LBA may be increased and/or the END_LBA may be increased in order to enforce WORM capabilities to all or part of the Read-Write areas. In a further embodiment (although illustrated in FIGS. 4A and 4B), there is an option to not provide a Value as part of the Set command, in which case it defaults to zero for the START_LBA and to the maximum LBA on the drive for both the HWM_LBA and the END_LBA. One example of this would be to turn the drive into an entirely write protected drive after all desired data has been written to the drive. A SET_START_LBA=0 command would permanently change the START_LBA to zero, thereby turning the start of the drive up to the HWM_LBA into the write protected WORM area. Likewise, a SET_HWM_LBA command with the maximum LBA on the drive would permanently change the HWM_LBA to the maximum LBA on the drive and a SET_END_LBA command with the maximum LBA on the drive will permanently set the END_LBA to the value of the maximum LBA that can be written to the drive, thereby extending the WORM area to the end of the drive. In an alternative embodiment, if the HWM_LBA is set higher than its corresponding END_LBA, then the END_LBA is set to equal the HWM_LBA. By issuing these three commands or a combined single command, the entire drive may be transformed into a write protected drive. For example, this may be desirable to prevent any updates to the file system directory after all files have been written and/or the WORM area(s) has been filled. Another example would be when the entire drive is to be permanently write protected such as when the HWM_LBA exceeds and/or equals the END_LBA, and in a configuration with multiple WORM areas this requirement could be present for each WORM area present on the drive or at least one WORM area.

There are many ways to represent special Set Commands. For example, they could be represented with additional ATA commands or they may be represented with unusual permutations of existing ATA commands. In one instance, the Set_START_LBA=0 command may take the form of a standard ATA command to a non-existent LBA (e.g., a Write instruction to LBA −500 (or a number less than the first LBA on the drive or other special Value, or a Read instruction with a special LBA and/or byte count may represent a SET_HWM_LBA to the maximum LBA on the drive).

FIG. 4A illustrates a method beginning with receiving a Set command by the drive controller, 405. The illustrated branches 410-419, 420-429, and 430-439 may be ordered in a different way than that illustrated as long as each branch is performed. In an alternative embodiment, after either of the first two branches are completed, the method determines if at least one more WORM parameter is to be modified by the Set command.

It is determined whether the Set command is for changing the START_LBA (e.g., Set_START_LBA), 410, and if it is, then it is determined whether the Value has been omitted (or provided depending on the logic used), 412. If the value has not been provided, then the Value is set to equal zero (or alternatively a negative number), 414. As noted above, the Value determination and Value setting steps may be omitted. A determination is made whether the Value is less than or equal to the current START_LBA, 416. If the Value satisfies this criterion, then the START_LBA is set to equal the Value, 418; otherwise in at least one alternative embodiment an error is returned by the drive controller, 419. The method branch from 418 and/or 419 (if present) proceeds to waiting for the next command, 490.

It is determined whether the Set command is for changing the HWM_LBA (e.g., Set_HWM_LBA), 420, and if it is, then it is determined whether the Value has been omitted (or provided depending on the logic used), 422. If the value has not been provided, then the Value is set to equal the maximum LBA for the drive, 424. As noted above, the Value determination and Value setting steps may be omitted. A determination is made whether the Value is greater than or equal to the current HWM_LBA, 426. If the Value satisfies this criterion, then the HWM_LBA is set to equal the Value, 428; otherwise in at least one alternative embodiment an error is returned by the drive controller, 429. The method branch from 428 and/or 429 (if present) proceeds to waiting for the next command, 490.

It is determined whether the Set command is for changing the END_LBA (e.g., Set_END_LBA), 430, and if it is, then it is determined whether the Value has been omitted (or provided depending on the logic used), 432. If the value has not been provided, then the Value is set to equal the maximum LBA for the drive, 434. As noted above, the Value determination and Value setting steps may be omitted. A determination is made whether the Value is greater than or equal to the current END_LBA, 436. If the Value satisfies this criterion, then the END_LBA is set to equal the Value, 438; otherwise in at least one alternative embodiment an error is returned by the drive controller, 439. The method branch from 438 and/or 439 (if present) proceeds to waiting for the next command, 490.

In at least one embodiment, if the Set command is not for any of the WORM parameters, then the drive controller waits for the next command to be received, 490. In an alternative embodiment, an error may be returned by the drive controller.

FIG. 4B illustrates a method that adjusts multiple WORM parameters with a single Set command; however, in an alternative embodiment the illustrated methods of FIGS. 4A and 4B may be combined. The method begins with receiving a Set All command, 405B. As with the method illustrated in FIG. 4A, the order of the Value checks for the WORM parameters and setting of the WORM parameters may be reordered from that illustrated in FIG. 4B. In an alternative embodiment, the setting of WORM parameters may occur as part of a branch akin to what is illustrated in FIG. 4A. FIG. 4B illustrates that after a Set All command is received, a check is performed for each of the WORM parameters beginning with the START_LBA, 410B. The comparison is to determine whether the Set All command omits a Value for the START_LBA or whether the Value if provided is greater than (or alternatively greater than or equal to) the current START_LBA. If the Set All command is determined to satisfy one of these criteria, then the Value is set to zero, 414B. A check is performed for the HWM_LBA, 420B. The comparison is to determine whether the Set All command omits a Value for the HWM_LBA or whether the Value if provided is less than (or alternatively less than or equal to) the current HWM_LBA. If the Set All command is determined to satisfy one of these criteria, then the Value is set to the largest LBA for the drive, 424B. A check is performed for the END_LBA, 430B. The comparison is to determine whether the Set All command omits a Value for the END_LBA or whether the Value if provided is less than (or alternatively less than or equal to) the current END_LBA. If the Set All command is determined to satisfy one of these criteria, then the Value is set to the largest LBA for the drive, 434B. FIG. 4B illustrates that after the checks are performed, the WORM parameters are set to their respective values, 418B, 428B, 438B; however, in an alternative embodiment these steps are consolidated to one step. The drive controller waits for the next command, 490.

In an alternative embodiment to that illustrated in FIG. 4B, the method includes a determination of whether any values are provided by the Set All command, and when the Values are omitted then the WORM parameter for the respective omitted Value is set to their respective minimum/maximum LBA of the drive before the drive controller waits for the next command, 490. After the omission determination is performed and it is determined there are no omitted Values, then the determinations of whether the respective Values are less/greater than their respective WORM parameter are performed and followed by 418B, 428B, 438B, and 490.

An alternative embodiment to protect the data on the storage drive is to disable all Write commands (including any command that would cause data to be overwritten) as a result of the drive controller and/or firmware receiving a special disable command. When the special command is received by the drive controller and/or firmware, it will not perform any command that would change data present on the storage drive. In a further embodiment, the drive controller and/or firmware will return an error to the computer system.

In another alternative embodiment, the storage drive is locked by the firmware in response to a special lock command. The firmware will set the appropriate indicators/flags/bits that inform the operating system (or connected file system) that the storage drive is read only. Alternatively or in addition, the firmware and/or the drive controller may send an instruction to the file system that the storage drive is read only and will not allow any data to be written to the physical storage medium. In a further embodiment, the special disable and special lock commands can be done together as a combined command that would prompt the firmware to perform the disabling and locking functions consecutively (i.e., disabling then locking or locking then disabling) or substantially simultaneously. In a further alternative embodiment, the receipt of the special disable command will prompt the locking function to be performed also.

The various embodiments discussed above provide examples of methods that in at least one embodiment are performed by a drive controller located on a storage drive and as such are examples of different means for performing different functions. In at least one embodiment, the system includes receiving means for receiving a Write command from an external source, integrity means for controlling the integrity of a WORM area, and adjustment means for changing the boundaries of a WORM area. The different examples of how it is determined whether a particular Write command is for a LBA within a WORM area and whether it will write over previously stored data are examples of the means for controlling the integrity of a WORM area. In at least one embodiment, the integrity means receives the Write command from the receiving means.

V. FILE SYSTEMS

Based on this disclosure it should be appreciated by one of ordinary skill in the art that a variety of file format structures may be utilized for the storage drives having a variety of storage capacities. For example, Master Boot Record (MBR) formatted disk partitions will work with disk partitions of 2 TB or less, because the FAT32 file system restricts use with the MBR format partitions. It has been found that for partitions greater than 2 TB, the GPT partition format should be used. Based on observation, it was determined that the exFAT file system format would be ideal for WORM storage drives implementation using the methods described herein. The exFAT file system format solves many of the FAT32 file system limitations. Through analysis of data, it was determined that the WORM requirement may be satisfied through the use of a single WORM Area with exFAT. Additionally, in order to utilize disks larger than 2 TB, the exFAT file system was selected, but other file systems may be used.

Figure 5:
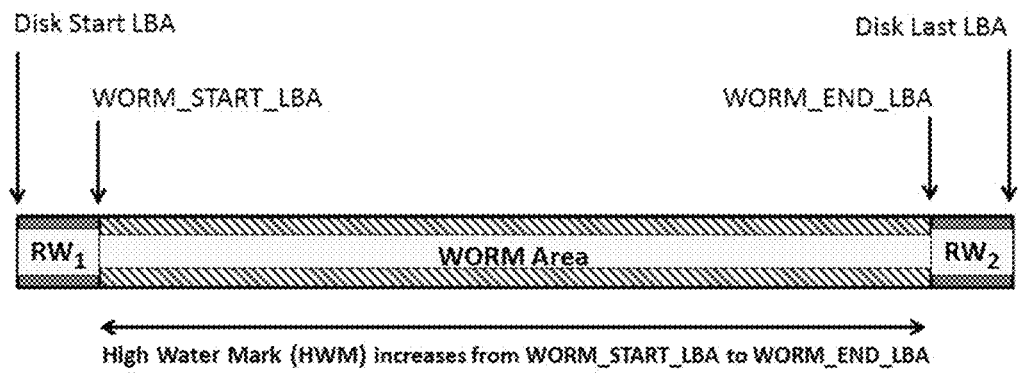
FIG. 5 illustrates another example WORM area on a storage drive media according to at least one embodiment of the invention.

One example of an implementation using the exFAT file system with GPT partitions on drives greater than 2 TB with a single WORM area with two distinct Read-Write areas is illustrated in FIG. 5. The HWM_LBA increases from the START_LBA to the END_LBA for the WORM area that allows each LBA to be written to only once, but read an unrestricted number of times. RW1 and RW2 illustrate the presence of unrestricted Read and Write areas.

Figure 6:
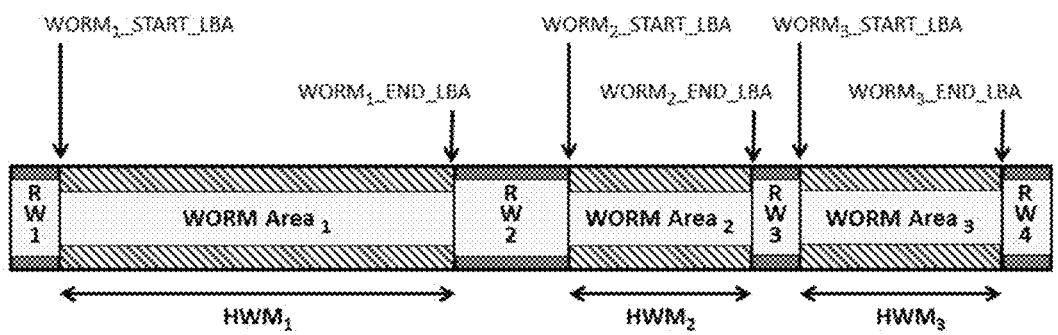
FIG. 6 illustrates an example set of WORM areas on a storage drive media according to at least one embodiment of the invention.

One example of an implementation with multiple WORM areas and multiple Read-Write areas is illustrated in FIG. 6. The different WORM areas in at least one embodiment are used as discrete WORM areas that the drive controller handles separately from each other such that their respective HWM_LBAs and boundary LBAs are used independently to determine whether the Write instruction is permitted. One or more of the RW areas may be system areas that have unrestricted Read and Write in contrast to the WORM areas that are write data only once for each LBA.

As will be appreciated by one of ordinary skill in the art, the present invention may be embodied, for example, as a computer and/or drive controller implemented method, a programmed computer and/or drive controller, and/or a data processing system. Accordingly, the present invention may take the form of an entirely hardware embodiment or an embodiment combining software and hardware aspects. Furthermore, the present invention may take the form of a computer program on a computer-usable storage medium having computer-usable program code embodied in the medium. Any suitable computer readable medium may be utilized including hard disks, CD-ROMs, optical storage devices, carrier signals/waves, or other storage devices.

Computer program code (or firmware) for carrying out operations of the present invention may be written in a variety of computer programming languages. The program code may be executed entirely on at least one computing device, one drive controller, and/or it may be executed partly on one computing device and partly on a remote storage drive.

It will be understood that each block of the flowchart illustrations and block diagrams and combinations of those blocks can be implemented by computer program instructions and/or means operating on a processor or a drive controller. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowcharts or block diagrams.

These computer program instructions may also be stored in a computer-readable memory that can direct a computer or other programmable data processing apparatus to function in a particular manner, such that the instructions stored in the computer-readable memory produce an article of manufacture including instruction means or program code that implements the function specified in the flowchart block or blocks.

Although particular commands and instructions have been given labels, one of ordinary skill in the art will appreciate based on this disclosure that the syntax and/or name can be modified while still providing the disclosed functionality.

The example and alternative embodiments described above may be combined in a variety of ways with each other. Furthermore, the steps and number of the various steps illustrated in the figures may be adjusted from that shown.

It should be noted that the present invention may, however, be embodied in many different forms and should not be construed as limited to the embodiments set forth herein; rather, the embodiments set forth herein are provided so that the disclosure will be thorough and complete, and will fully convey the scope of the invention to those skilled in the art. The accompanying drawings illustrate exemplary embodiments of the invention.

Although the present invention has been described in terms of particular example and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the example and alternative embodiments described above can be configured without departing from the scope and spirit of the invention. Therefore, it is to be understood that, within the scope of the appended claims, the invention may be practiced other than as specifically described herein.

VI. TERMINOLOGY

ASIC—Application Specific Integrated Circuit.

Block—contents of data written to the disk. May be a Logical Block or a Physical Block (or sector). The size of the Block, or the number of data bytes within a Block, may be any value. Commonly Block sizes are powers of two and typical examples are 513 bytes and 4096 bytes.

Boundaries—The lower limit and upper limit LBAs that define any WORM area. Any reference to WORM area may refer to a single instance or multiple instances. The lower limit is referenced as START_LBA and the upper limit is referenced as END_LBA, each of which may refer to one or more instances of an associated WORM area.

Drive (or Storage Drive)—is a storage mechanism, in which data are digitally recorded by various electronic, magnetic, optical, electrical or mechanical methods on a surface layer deposited of one or more planar, round and rotating disks (or discs), or on solid state electronics, or on other media. A drive is a device implementing such a storage mechanism with fixed or removable media; with removable media the device is usually distinguished from the media as in compact disc drive and the compact disc. Examples include but are not limited to the hard disk drive (HDD) containing a non-removable disk, the solid state disk (SSD), flash memory and its removable media, the floppy disk drive (FDD) and its removable floppy disk, and various optical disc drives and associated optical disc media.

Drive Controller (or Controller)—the electronics (or processor) that control the operation of the drive.

Commands (or Instructions)—information sent to the drive controller in order to control, read or write data or status information or to act upon the drive in any way.

Firmware—data that controls the operation of the drive controller to perform operations on the drive in response to received commands. It may be sent to, or read from the controller, or it may be placed into a permanent or removable memory circuit.

FPGA—Field Programmable Gate Array.

Flash—The ability to load firmware, software or any other executable code, parameters or other data into the drive controller for any purpose.

HWM_LBA (or HWM)—High Water Mark LBA is the numerically largest value of the LBA that has been written within the associated WORM Area.

LBA—Logical Block Address is a common scheme used for specifying the location of blocks of data stored on computer storage devices, generally secondary storage systems such as storage drives. LBA is a particularly simple linear addressing scheme; Blocks are located by an integer index, with the first block being LBA 0, the second LBA 1, and so on.

Logical Block—the contents of data written to or read from the drive. Each Logical Block has a unique Logical Block Address (LBA). Logical Blocks map to a Physical Block on the drive.

Media—Any recording media including hard disk, solid state, flash, optical or other storage devices.

Physical Block (or sector)—the contents of the data written to or read from the drive. Sector addresses when used in connection to circular disks map to a unique physical disk cylinder, head and sector number on the disk.

WORM—Write Once Read Many. Data may only be written one time, updates or re-writes of the data at the same LBA are denied. Read requests for the data is unrestricted.

WORM Area—a contiguous group of LBAs on a disk defined by Boundaries consisting of a starting LBA and an ending LBA. Each data block with an LBA within the starting LBA and ending LBA bounds is permitted to be written one time only.

We claim:

1. A method for providing write once ready many times media on a storage drive in communication with an external computing system, said method comprising:
 receiving a Write command with a drive controller where the Write command is sent from the external computing system;
 determining with the drive controller whether the Write command is for a LBA within the WORM boundary area on a storage drive media as defined by a START_LBA and an END_LBA;
 when the LBA to be written is not within the WORM boundary area, then the drive controller performs the Write command on the storage drive media; and
 when the LBA to be written is within the WORM boundary area, then the drive controller
  determines whether the LBA to be written to is greater than a HWM_LBA,
  when the LBA to be written to is not greater than the HWM_LBA, the drive controller sends an error condition to the external computing device and the drive controller does not perform the Write command, and
  when the LBA to be written to is greater than the HWM_LBA, the drive controller performs the Write command on the storage drive media and updates the HWM_LBA to equal the last LBA written to as part of the Write command; and
 setting the START_LBA equal to a lowest LBA on the storage device media and the END_LBA and the HWM_LBA equal to a largest LBA on the storage device media in response to a single command received by the drive controller.

2. The method according to claim 1, wherein when the LBA to be written to is greater than the HWM_LBA, the drive controller stores the updated HWM_LBA in at least one of a non-volatile memory and a persistent memory.

3. The method according to claim 1, further comprising activating the WORM capability upon receiving an activation instruction by the drive controller.

4. A storage device comprising:
 a physical storage media; and
 a drive controller in electrical communication with said physical storage media, said drive controller having encoded thereon:
  first program instructions executable by said drive controller to cause said drive controller to handle a Write command sent from an external computing system;
  second program instructions executable by said drive controller to cause said drive controller to determine with the drive controller whether the Write command is for a LBA within a WORM boundary area on the physical storage media as defined by a START_LBA and an END_LBA;
  third program instructions executable by said drive controller to cause said drive controller to perform the Write command on the physical storage media when the LBA to be written to is not within the WORM boundary area;
  fourth program instructions executable by said drive controller to cause said drive controller to perform the following when the LBA to be written is within the WORM boundary area:
   determine whether the LBA to be written to is greater than a HWM_LBA,
   when the LBA to be written to is not greater than the HWM_LBA, the drive controller sends an error condition to the external computing device and the drive controller does not perform the Write command, and
   when the LBA to be written to is greater than the HWM_LBA, the drive controller updates the HWM_LBA to equal the last LBA written to as part of the Write command and then performs the Write command on the physical storage media; and
  fifth program instructions executable by said drive controller to cause said drive controller to set the START_LBA equal to a lowest LBA on said storage device and the END_LBA and the HWM_LBA equal to a largest LBA on said storage device.

5. The storage device according to claim 4, further comprising a persistent memory in communication with said drive controller, said persistent memory stores at least one of the HWM_LBA, the START_LBA, and the END_LBA.

6. The storage device according to claim 4, wherein said first program instructions, said second program instructions, said third program instructions, said fourth program instructions, and said fifth program instructions, are present in a firmware residing on said drive controller.

7. The storage device according to claim 4, further comprising a non-volatile storage in communication with said drive controller, said non-volatile storage stores at least one of the HWM_LBA, the START_LBA, and the END_LBA.

8. The storage device according to claim 4, further comprising a persistent memory in communication with said drive controller, said persistent memory stores the HWM_LBA, the START_LBA, and the END_LBA.

9. The storage device according to claim 4, wherein the physical storage media has multiple WORM areas each with its own HWM_LBA, START_LBA, and END_LBA.

10. The storage device according to claim 4, wherein said fifth program instructions executable by said drive controller operate in response to a Set command received by said drive controller.

11. The storage device according to claim 10, further comprising a persistent memory in communication with said drive controller, said persistent memory stores at least one of the HWM_LBA, the START_LBA, and the END_LBA.

12. The storage device according to claim 4, further comprising a sixth program instructions executable by said drive controller to cause said drive controller to disable performance of Write commands on said storage device.

13. A storage device comprising:
 a physical storage media; and
 a drive controller in electrical communication with said physical storage media, said drive controller having encoded thereon instructions to be performed in response to said drive controller receiving a Write command from an external computing system:
  first program instructions executable by said drive controller to cause said drive controller to determine with the drive controller whether the Write command is for a LBA within a WORM boundary area on the physical storage media as defined by a START_LBA and an END_LBA;

second program instructions executable by said drive controller to cause said drive controller to perform the Write command on the physical storage media when the LBA to be written to is not within the WORM boundary area;

third program instructions executable by said drive controller to cause said drive controller to perform the following when the LBA to be written is within the WORM boundary area:
- determine whether the LBA to be written to is greater than a HWM_LBA,
- when the LBA to be written to is not greater than the HWM_LBA, the drive controller sends an error condition to the external computing device and the drive controller does not perform the Write command, and
- when the LBA to be written to is greater than the HWM_LBA, the drive controller updates the HWM_LBA to equal the last LBA written to as part of the Write command and then performs the Write command on the physical storage media; and fourth program instructions executable by said drive controller to cause said drive controller to set the START_LBA equal to a lowest LBA on said storage device and the END_LBA and the HWM_LBA equal to a largest LBA on said storage device.

* * * * *